July 12, 1927.
B. P. JOYCE
PACKING
Filed July 11, 1922
1,635,482
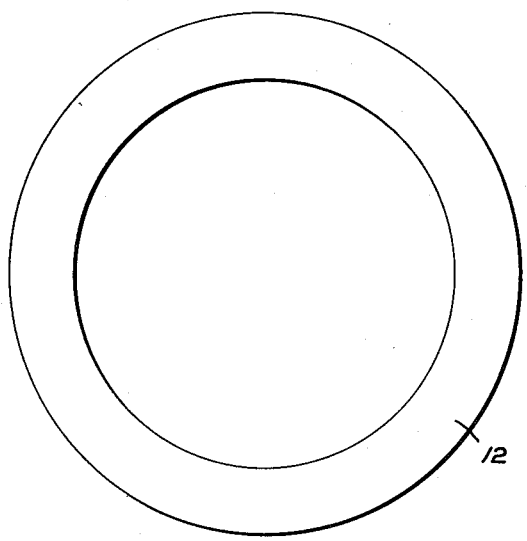
FIG.1.
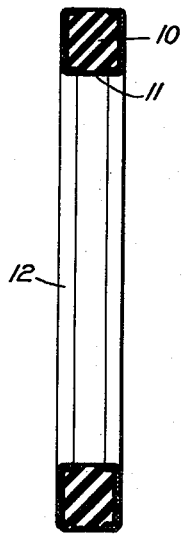
FIG.2.
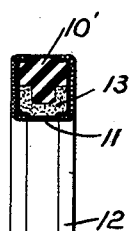
FIG.5.
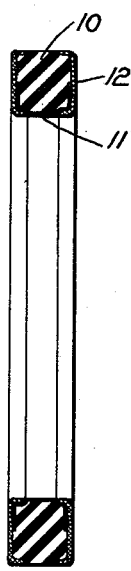
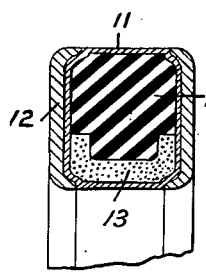
FIG.3.
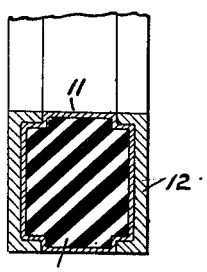
FIG.6.
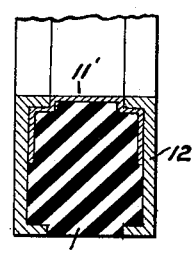
FIG.7.
FIG.4.
INVENTOR
*Bryan P. Joyce*
BY *W. N. Roach*
ATTORNEY Patented July 12, 1927.

1,635,482

UNITED STATES PATENT OFFICE.

BRYAN P. JOYCE, OF WASHINGTON, DISTRICT OF COLUMBIA.

PACKING.

Application filed July 11, 1922. Serial No. 574,329.

The subject of this invention is a packing such as is required in stuffing boxes, pistons, and cylinder heads to prevent leakage of fluid under pressure.

In providing a packing it is desirable that the packing be flexible and to some extent resilient; that its surface be such that the friction between moving parts will be as low as it can consistently be made; and that the contact surfaces will have no deleterious effect upon each other.

Packings of various kinds have been devised among which are resilient rubber packings which are injuriously affected by contact with oils and other substances and which readily deteriorate under friction. Leather packings have also been used with good results, but when such packing is used and the device stored away and not operated for some time the metal parts which are in contact with the leather become pitted, due no doubt to the tannic acid in the leather. All metal packings are useful in certain places but the friction set up when such packing is used renders it unfit for use in many instances.

My invention was devised to provide a packing which would have the advantage of a resilient and flexible packing, producing no more friction than that had with such packings, and would also have the advantage of metal to metal contact, thereby avoiding any deleterious effect either to the packing or packed parts.

My invention, therefore, consists in the provision of a flexible and, preferably resilient filler or packing encased in a flexible metal casing, or the surface of which has been coated with metal.

In the accompanying drawing, in which practical embodiments of my invention are illustrated, like reference numerals indicate the same or similar parts throughout the various views and, in such drawing:

Fig. 1 is a view in side elevation of a packing ring constructed in accordance with the invention;

Fig. 2 is a cross section of the same;

Fig. 3 is a similar view of a modified form; and

Fig. 4 is a similar view of a still further modification;

Fig. 5 is an enlarged sectional view of my packing-ring with the leather facing located adjacent the outer circumference of the ring when arranged for a packing ring as distinguished from the form of stuffing-box ring where the leather facing is placed adjacent the inner circumference of the ring as in Fig. 3; and Fig. 6 shows an enlarged sectional detail of my packing-ring as illustrated in Fig. 2; and Fig. 7 is a similar view of the modified form shown in Fig. 4.

In carrying out my invention I prefer to provide a resilient filler, herein shown as a rubber ring 10, which is encased in a flexible metal casing 11. While I prefer to make this casing of metal foil, conveniently tin foil, the surface of the ring may have metal deposited thereon in any manner which will give a flexible non-porous metal surface. The filler and casing may be held and protected by cup rings 12.

In the modification shown in Fig. 3 the parts are similar to those hereinbefore described with the exception that the filler 10' is somewhat changed in form to permit the insertion of a leather ring 13, the filler and ring being then encased in the metal 11.

In the modification shown in Fig. 4 the parts are the same as those shown in Figs. 1 and 2 except that the metal casing 11' is only applied to that portion of the packing which comes in contact with a moving part.

This invention may be used in connection with the packing disclosed in the applicant's Patents 1,460,419 and 1,585,864. By casing the rubber and the rubber and leather fillers disclosed in these patents, in soft metal such as tin foil, several very desirable objects are accomplished. 1—The casing prevents the leather from attacking the polished surfaces with which it was formerly in contact. 2—The casing prevents the rubber from attacking surrounding parts. 3—The leather may be eliminated, using the casing as the rubber protecting surface. 4—The casing retards deterioration of the rubber. 5—Under pressure the soft fillers may be considered semifluid and are restrained from longitudinal escape by the cupped rings at either side, therefore a soft metal such as tin offers a sealing surface comparable to rubber and will retain gas under pressure as such a surface will do. 6—In high pressure machines such as artillery recuperators the packing friction is so great that it must be carefully computed and allowed for. Experiments have shown that a friction surface of tin will give the same friction as a friction surface of leather in the above packing, permitting packing fillers in existing machines to be cased in tin without change in the functioning of the machine due to change in packing friction.

I claim:

1. A packing ring, embodying a filler ring having soft metal upon a sealing contact surface, and annular channel-shaped retaining rings of relatively harder metal embracing the filler ring laterally, the circumferential flanges of said retaining rings being adapted to bear against the surface with which the soft metal has sealing contact to prevent any escape of the soft metal beyond the retaining rings.

2. A packing ring, embodying an annular filler, a soft metal casing surrounding said filler, and annular channel-shaped retaining rings of relatively harder metal embracing the filler and casing laterally, the circumferential flanges of said retaining rings being adapted to bear against the surfaces with which the casing has sealing contact to prevent any escape of the casing beyond the retaining rings.

BRYAN P. JOYCE.